(12) United States Patent
Cope et al.

(10) Patent No.: US 12,271,072 B2
(45) Date of Patent: *Apr. 8, 2025

(54) UBIQUITOUSLY MOUNTABLE IMAGE DISPLAY SYSTEM

(71) Applicant: Nanolumens Acquisition, Inc., Peachtree Corners, GA (US)

(72) Inventors: Richard Cope, Duluth, GA (US); Aris Silzars, Sammamish, WA (US)

(73) Assignee: Nanolumens Acquisitions, Inc., Peachtree Corners, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,537

(22) Filed: Dec. 11, 2023

(65) Prior Publication Data

US 2024/0103309 A1 Mar. 28, 2024

Related U.S. Application Data

(63) Continuation of application No. 17/819,366, filed on Aug. 12, 2022, now Pat. No. 11,841,566, which is a continuation of application No. 17/555,300, filed on Dec. 17, 2021, now Pat. No. 11,774,788, which is a continuation of application No. 16/846,392, filed on Apr. 12, 2020, now Pat. No. 11,204,516, which is a continuation of application No. 14/627,008, filed on Feb. 20, 2015, now Pat. No. 10,620,463, which is a (Continued)

(51) Int. Cl.
*G09G 3/30* (2006.01)
*G02F 1/1333* (2006.01)
*G02F 1/13357* (2006.01)
*G06F 1/16* (2006.01)
*G09G 3/20* (2006.01)
*G09G 3/34* (2006.01)
*G09G 3/36* (2006.01)

(52) U.S. Cl.
CPC .. *G02F 1/133305* (2013.01); *G02F 1/133603* (2013.01); *G06F 1/16* (2013.01); *G09G 3/2003* (2013.01); *G09G 3/3413* (2013.01); *G09G 3/3426* (2013.01); *G09G 3/36* (2013.01); *G09G 3/3406* (2013.01); *G09G 2354/00* (2013.01); *G09G 2380/02* (2013.01)

(58) Field of Classification Search
None
See application file for complete search history.

(56) References Cited

U.S. PATENT DOCUMENTS 5,747,928 A 5/1998 Shanks et al.
5,913,433 A * 6/1999 Belokin .............. A47F 3/0486
211/75

(Continued)

*Primary Examiner* — Joseph R Haley
(74) *Attorney, Agent, or Firm* — Troutman Pepper Hamilton Sanders LLP; James E. Schutz; Jacob M. Burr

(57) ABSTRACT

A ubiquitously mountable image display system includes a shape-reconfigurable display screen component to which is attached a plurality of circuit modules each having at least one light source. The shape-reconfigurable display screen component is formed of a material that accommodates flexing of the display screen component without creating a perceivable aberration in separation distance between two or more picture elements of an image that is rendered upon a viewing plane of the display screen component when light from the plurality of light sources is directed towards the viewing plane.

13 Claims, 12 Drawing Sheets

Related U.S. Application Data continuation of application No. 13/241,145, filed on Sep. 22, 2011, now Pat. No. 8,963,895.

(56) References Cited

U.S. PATENT DOCUMENTS

| | | |
|---|---|---|
| 6,332,690 B1 | 12/2001 | Murofushi |
| 6,819,045 B2 | 11/2004 | Okita et al. |
| 6,974,971 B2 | 12/2005 | Young |
| 7,242,398 B2 | 7/2007 | Nathan et al. |
| 7,636,085 B2 | 12/2009 | Yang |
| 7,710,370 B2 | 5/2010 | Slikkerveer et al. |
| 7,714,801 B2 | 5/2010 | Kimmel |
| 7,825,582 B2 | 11/2010 | Furukawa et al. |
| 7,834,537 B2 | 11/2010 | Kee et al. |
| 7,834,962 B2 | 11/2010 | Satake et al. |
| 7,868,545 B2 | 1/2011 | Hioki et al. |
| 7,977,170 B2 | 7/2011 | Tredwell et al. |
| 8,023,060 B2 | 9/2011 | Lin et al. |
| 8,096,068 B2 | 1/2012 | Van Rens |
| 8,097,812 B2 | 1/2012 | Wang et al. |
| 8,098,486 B2 | 1/2012 | Hsiao et al. |
| 8,228,667 B2 | 7/2012 | Ma |
| 8,284,369 B2 | 10/2012 | Chida et al. |
| 8,319,725 B2 | 11/2012 | Okamoto et al. |
| 8,456,078 B2 | 6/2013 | Hashimoto |
| 8,471,995 B2 | 6/2013 | Tseng et al. |
| 8,477,464 B2 | 7/2013 | Visser et al. |
| 8,493,520 B2 | 7/2013 | Gay et al. |
| 8,493,726 B2 | 7/2013 | Visser et al. |
| 8,654,519 B2 | 2/2014 | Visser et al. |
| 8,780,039 B2 | 7/2014 | Gay et al. |
| 8,816,977 B2 | 8/2014 | Rothkopf et al. |
| 8,873,225 B2 | 10/2014 | Huitema et al. |
| 8,982,545 B2 | 3/2015 | Kim et al. |
| 9,117,384 B2 | 8/2015 | Phillips et al. |
| 9,176,535 B2 | 11/2015 | Bohn et al. |
| 9,286,812 B2 | 3/2016 | Bohn et al. |
| 9,335,793 B2 | 5/2016 | Rothkopf |
| 9,372,508 B2 | 6/2016 | Wang |
| 9,459,656 B2 | 10/2016 | Shai |
| 2006/0098153 A1 | 5/2006 | Slikkerveer et al. |
| 2006/0204675 A1 | 9/2006 | Gao et al. |
| 2007/0241002 A1 | 10/2007 | Wu et al. |
| 2008/0042940 A1 | 2/2008 | Hasegawa |
| 2008/0218369 A1 | 9/2008 | Krans et al. |
| 2008/0278432 A1 | 11/2008 | Ohshima |
| 2009/0189917 A1 | 7/2009 | Benko et al. |
| 2009/0219225 A1 | 9/2009 | Cope |
| 2009/0289877 A1 | 11/2009 | Kwon et al. |
| 2011/0037742 A1 | 2/2011 | Suh |
| 2011/0134144 A1 | 6/2011 | Moriwaki |
| 2011/0254877 A1 | 10/2011 | Mowry et al. |
| 2012/0002360 A1 | 1/2012 | Seo et al. |
| 2012/0056859 A1* | 3/2012 | Chen .................. G09G 3/20 |
| | | 445/24 |
| 2012/0092363 A1 | 4/2012 | Kim et al. |
| 2012/0313862 A1 | 12/2012 | Ko et al. |
| 2013/0100392 A1 | 4/2013 | Fukushima |

\* cited by examiner

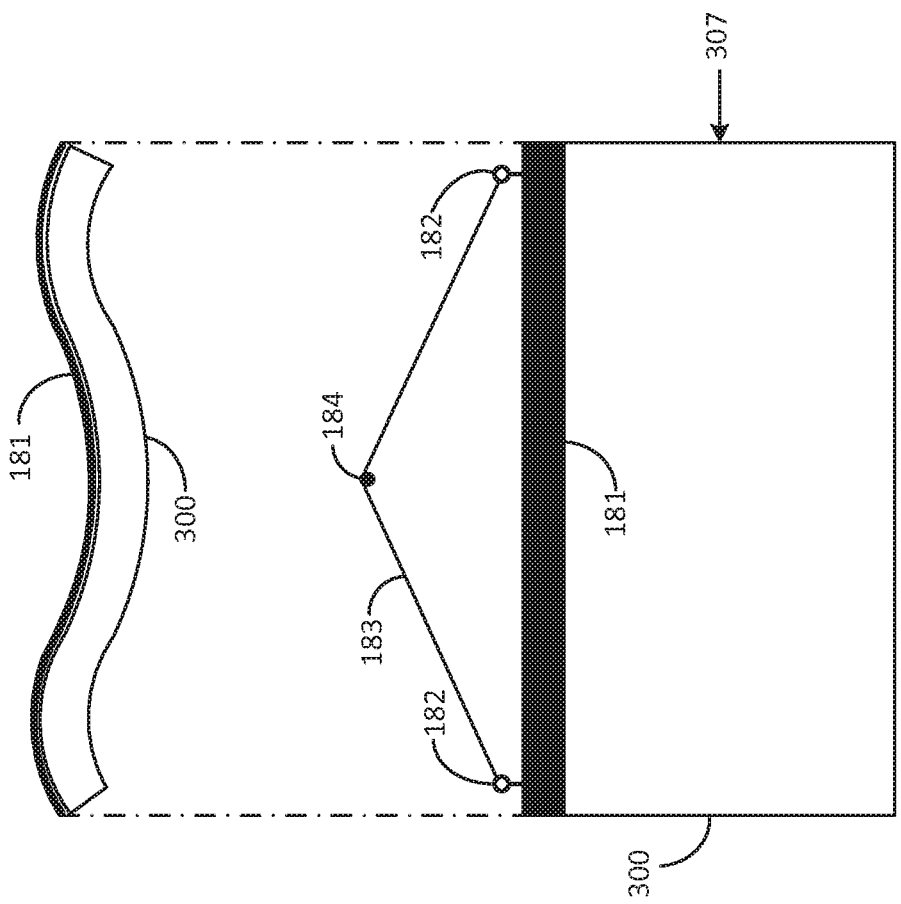

UBIQUITOUSLY MOUNTABLE IMAGE DISPLAY SYSTEM

CROSS REFERENCE TO RELATED APPLICATIONS

This application is a continuation of and claims the benefit of prior filed U.S. non-provisional utility application Ser. No. 17/819,366, filed Aug. 12, 2022, application Ser. No. 17/819,366 is a Continuation of application Ser. No. 17/555,300, filed Dec. 17, 2021. Application Ser. No. 17/555,300 is a Continuation of and claimed the benefit of US non-provisional utility application Ser. No. 16/846,392, filed Apr. 12, 2020. Application Ser. No. 16/846,392 is a Continuation of and claimed the benefit of application Ser. No. 14/627,008, filed Feb. 20, 2015. Application Ser. No. 14/627,008 is a continuation of and claimed the benefit of application Ser. No. 13/241,145 filed on Sep. 22, 2011. Application Ser. Nos. 16/846,392, 14/627,008 and 13/241,145 are incorporated herein by reference.

DESCRIPTION OF RELATED ART

The use of traditional large screen displays is often restricted as a result of inhospitable mounting conditions. One such inhospitable mounting condition that is often encountered both indoors as well as outdoors, is the lack of a flat mounting surface. As can be appreciated, a flat mounting surface readily accommodates various types of mounting arrangements and thereby constitutes a relatively hospitable environment for mounting traditional large screen displays.

Unfortunately, many indoor as well as outdoor structures have various protrusions and curved surfaces located at certain spots that may coincidentally be the most desirable in terms of visibility to viewers. The traditional approach to solving this problem is to either mount the large screen display at a less than desirable alternative location, or to mount it upon the non-flat surface by using a customized mounting fixture along with its attendant handicaps such as material cost, labor cost, weight issues etc.

As for the weight issue, even a flat mounting surface may turn out to be unsuitable for mounting a large screen display if the mounting surface is unable to bear the weight of a traditional large screen display. As is known, the heaviness of the traditional large screen display is a result of not only the weight of the screen itself, but also the weight of the housing in which the screen is housed, and the weight of the mechanical and electronic components contained inside the housing. The weight issue associated with using a traditional large screen display is further exacerbated by the weight of the mounting fixture, more so a customized mounting fixture when used for mounting the display on a non-flat surface.

To elaborate further upon certain other aspects associated with a traditional large screen display, attention is first drawn to FIG. 1, which shows a generic structure of a traditional large screen display system 100.

When display system 100 is an LCD display system, the various components may be generically described as including an LCD display screen 115, a back-lighting system 110, and drive electronics 105. The integrated packaging of these components, as well as other components that are not shown (frame, cabinet, etc), leads to a cumbersome arrangement having various limitations in terms of mounting considerations, cost, limited field of view etc. Specifically, in FIG. 1, the limited field of view (indicated by arrow 125) is typically constrained to a frontal view with a viewing angle that is often significantly less than 180 degrees.

When display system 100 is a plasma display system (rather than an LCD system), the various components may be generically described as including a plasma display screen 115, a plasma drive system 110, and imaging/drive electronics 105. Plasma display screen 115 contains multiple compartments 120 that contain gas for exciting a phosphor coating inside the display screen 115. The plasma display system also suffers from the same issues as described above with reference to the LCD display system. Additionally, the plasma display system suffers from heat related, as well as weight related issues when compared to the LCD display system.

Attention is now drawn to FIGS. 2A-2E, which show a few examples of inhospitable mounting surfaces, and may be used to elaborate upon certain problems associated with mounting traditional large screen displays upon such inhospitable mounting surfaces.

FIG. 2A shows an outward bulging surface 205 that fails to provide a suitably flat surface for mounting display system 100. As a result of the bulging, a customized mounting fixture would be needed for mounting display system 100 upon surface 205. Understandably, the customized mounting fixture would have to provide multiple anchoring points on curved surface 205 so as to overcome problems associated with using a single point anchor. Furthermore, if the curvature of surface 205 is relatively steep, each of the mounting brackets that make contact with the multiple anchoring points has to be designed to have a corresponding curvature so as to provide a firm fixation upon surface 205. Such requirements add to the cost and complexity of the customized mounting fixture.

FIG. 2B shows an inwardly curved surface 210, such as a niche or a recess in a wall. Here again, a customized mounting fixture is need for mounting the display system 100 upon surface 210. Furthermore, if the curvature of surface 210 is different than that of surface 205 (FIG. 2A), the customized mounting fixture that was used upon surface 205 may not be reusable upon surface 210 even if it is desirable to relocate display system 100 to this other location.

FIG. 2C also shows an inwardly curved surface such as the one shown in FIG. 2B. However, the inwardly curved surface 215 of FIG. 2C has a width and a curvature that does not permit mounting of display system 100 inside surface 215.

FIG. 2D shows a circular mounting surface 220, such as one associated with a pillar for example. The extreme degree of curvature of circular mounting surface 220 would not only necessitate a customized mounting fixture but may also constitute a potential hazard in terms of creating protrusions in the path of passers-by.

FIG. 2E shows a double-curvature surface 225, which again necessitates a more elaborate, customized mounting fixture for mounting display system 100.

SUMMARY

A ubiquitously mountable image display system includes a shape-reconfigurable display screen component to which is attached a plurality of circuit modules each having at least one light source. The shape-reconfigurable display screen component is formed of a material that accommodates flexing of the display screen component without creating a perceivable aberration in separation distance between two or more picture elements of an image that is rendered upon a viewing plane of the display screen component when light from the plurality of light sources is directed towards the viewing plane.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views. Suffixes appended to reference numerals are generally indicative of alternative embodiments. As an illustrative example, "405A" (i.e. a reference numeral "405" with appended suffix "A") is indicative of a first alternative embodiment of an element "405," while "405B" indicates a second alternative embodiment of "405."

FIGS. 11A-11B shows an attachable bar that is attached to a display screen component, and an illustrative example of a mounting arrangement for the display screen component having the bar attached.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that the description provided below with respect to mounting the ubiquitously mountable image display system upon a curved surface does not preclude mounting of the ubiquitously mountable image display system upon a flat surface. A person of ordinary skill in the art will recognize the advantages associated with using the ubiquitously mountable image display system described herein (reduced weight, portability, cost etc) for a wide variety of applications (including numerous traditional applications such as flat surface mounting). It will also be understood, that the word "image" as used herein does not merely refer to a static image (such as a JPEG image) but encompasses moving images as well (movies, video clips, dynamically varying advertising material, text messages etc). It will be further understood that a reference may be made to one particular embodiment (for example, an ubiquitously mountable image display system "300") or to one particular element (for example, "module 310") solely in the interests of convenience for purposes of description. However, such a reference and/or accompanying description may be equally applicable to various other embodiments (for example, ubiquitously mountable image display system "400") or another element (for example, "310C"). A person of ordinary skill in the art should recognize such equivalencies and understand that the teachings below encompass such diverse elements and applications.

Figure 1:
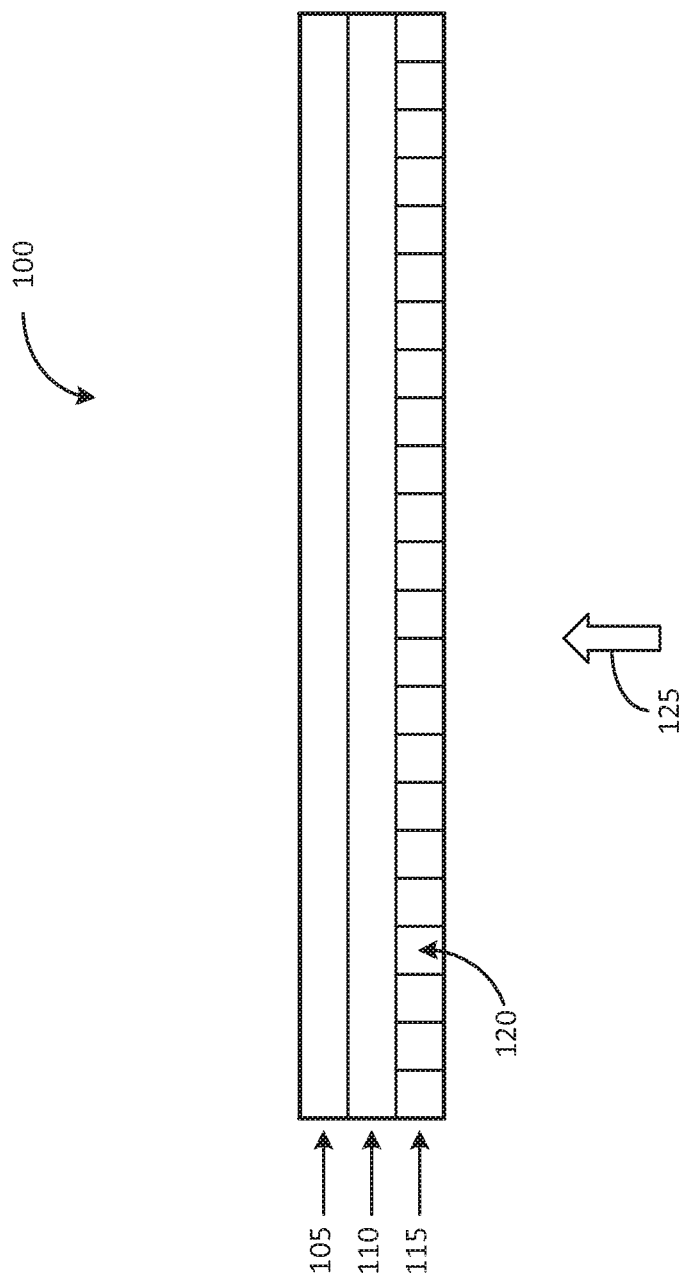
FIG. 1 shows a generic structure of a prior-art large screen display system.
Figure 2C:
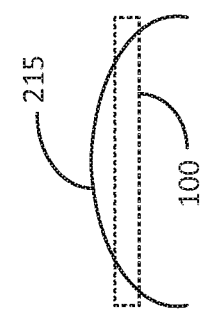
FIGS. 2A-2E show various inhospitable mounting surfaces for mounting prior-art large screen displays.
Figure 2B:
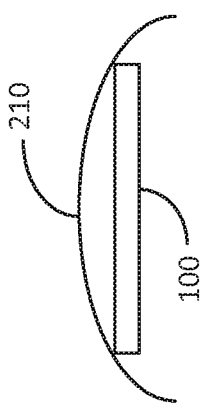
Figure 2A:
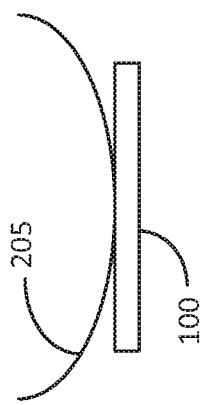
Figure 2E:
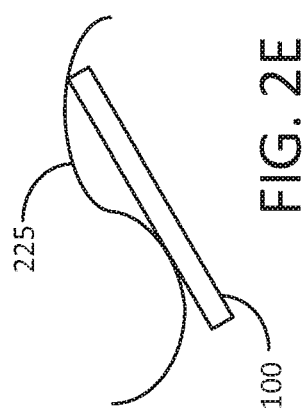
Figure 2D:
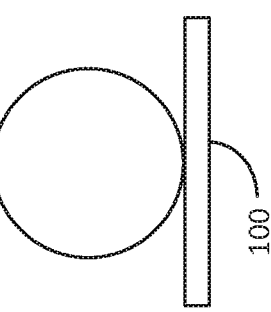
Figure 3:
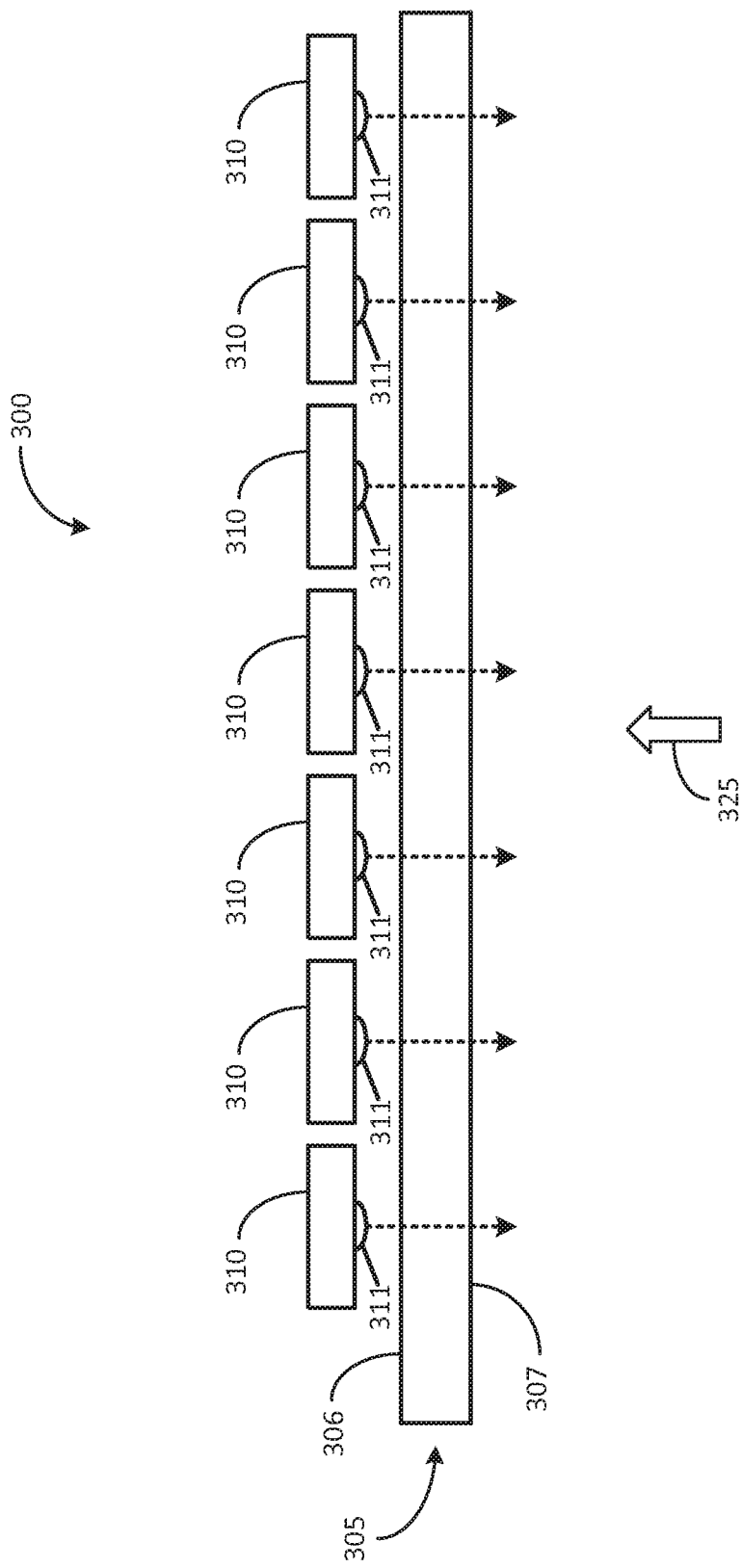
FIG. 3 shows some components of a ubiquitously mountable image display system in accordance with the invention.

Attention is now drawn to FIG. 3, which shows a ubiquitously mountable image display system 300 in accordance with the invention. Ubiquitously mountable image display system 300 includes a display screen component 305 and a plurality of light source circuit modules, each designated by the reference designator 310, and each containing at least one light source 311. The plurality of light source circuit modules are cooperatively arranged with respect to a mounting surface 306 of display screen component 305 so as to project light through display screen component 305 and render an image upon a viewing plane 307 of display screen component 305 (viewable along a frontal viewing axis designated by arrow 325). Each light source 311 provides one pixel of the image rendered upon viewing plane 307. Pixel information may be generated by modulating each light source 311 using one or more control signals provided from a control unit (not shown).

In one embodiment, display screen component 305 is composed of a material that provides partial transmissivity to light. As a result, light emitted by each light source 311 is partially diffused so as to create smooth transitional boundaries between the pixels of the image rendered on viewing plane 307. Various types of materials may be used for this purpose. A few non-limiting examples include various types of plastics, fiberglass, acrylic and other polymers. Some of the criteria that may be used for selecting this material includes: a desired level of flexing capability along one or more axes, minimal weight, high machinability (cutting, drilling, punching, polishing, finishing etc), and a desired level of diffusion/transmissivity to RGB (red, green, blue) light.

In another embodiment, display screen component 305 is composed of a material that can accommodate selective blocking of light emitted by each light source 311. A few nonlimiting examples where such material is used includes a liquid crystal display (LCD) panel, and a digital light processing (DLP) panel. In this embodiment, the display screen component 305 may be suitably controlled via electronic circuitry (not shown) in order to perform the selective blocking of light. The blocking may be configured at a pixel level, or higher.

Irrespective of the nature of the material used in display screen component 305, there are two features of display screen component 305 that may be deemed somewhat more important than others. These two features are: the ability to flex along one or more axes, and minimal weight. The ability to flex allows display screen component 305 to be ubiquitously mounted on various types of hospitable as well as inhospitable mounting surfaces. This aspect will be described below in further detail using other figures. As for the minimal weight aspect, display screen component 305 is not only selected on the basis of a suitably light material, but each light source circuit module 310 is designed to contain minimal circuitry, such that the combination of display screen component 305 and light source circuit modules 310 can be assembled as one integrated display unit having significantly less weight than an equivalent prior-art large screen display unit. It should be understood that a significant amount of the control circuitry that provides signals to each light source circuit module 310 is contained inside a separate assembly (a control unit, not shown in FIG. 3), which may be located at a remote location (a table, for example), thereby not contributing additional weight to the integrated display unit.

Each light source circuit module 310 is individually attached to mounting surface 306 using a suitable adhesive, or suitable mechanical fasteners (bolts, nuts, rivets, spacers etc), with no enclosure or frame deemed essential for holding together the resulting assembly. The elimination of the enclosure and/or frame reduces additional weight that may not only be unnecessary but undesirable as well in certain applications. For example, in an indoor environment, such as an exhibition hall, a cabinet may not be needed for protecting ubiquitously mountable image display system 300 from natural elements such as sun, wind, and rain.

Furthermore, the weight of image display system 300 may be kept to a minimum for certain applications (for example when hung from a ceiling) by eliminating various hardware elements such as mounting brackets, user controls, and metal bolts. However, it should be understood that such hardware elements are not necessarily precluded from being used in various applications, and thus, one or more of these elements can be optionally included with ubiquitously mountable image display system 300 when so desired. A minimally configured ubiquitously mountable image display system 300 may thus be described as a frame-free, cabinet-less, shape-reconfigurable display system.

Figure 4:
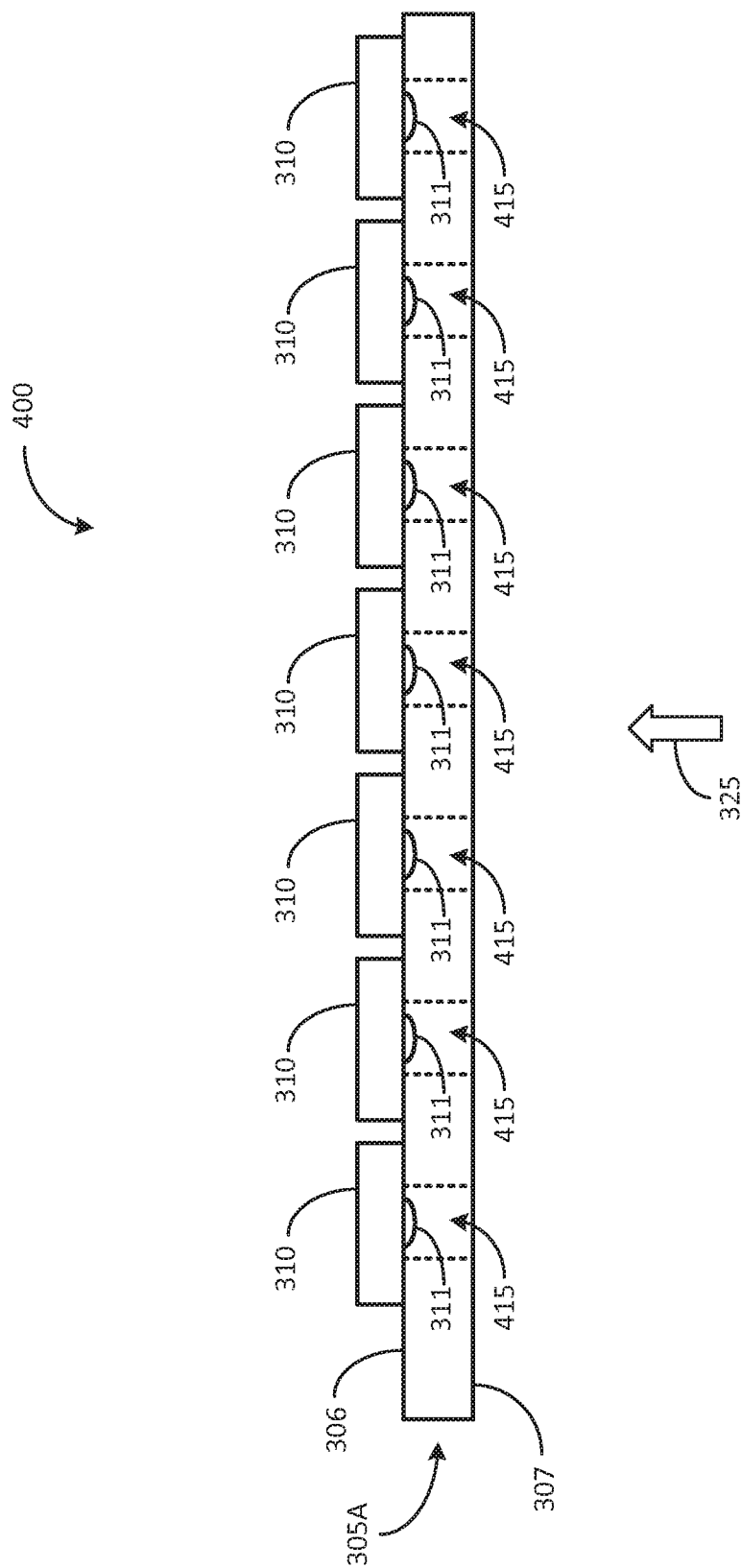
FIG. 4 shows a first alternative embodiment of the ubiquitously mountable image display system shown in FIG. 3.

FIG. 4 shows a ubiquitously mountable image display system 400 where each of the plurality of light source circuit modules 310 is flush-mounted upon a display screen component 305A. In this particular version, display screen component 305A contains a plurality of perforations 415 each of which is aligned to a corresponding light source 311 that is partially or wholly inserted into the perforation 415. In this configuration, each of the light source circuit modules 310 may be attached to mounting surface 306 of display screen component 305A using an adhesive that is selected to provide a desired degree of adhesiveness at one or more selected points of contact between each light source module 310 and display screen component 305A. In one implementation, the points of contact may be selected to lie along one or more edges of light source circuit module 310, while in another implementation, the points of contact may be selected to correspond to one or more corners of light source circuit module 310.

In this embodiment, display screen component 305A is formed of a material that is substantially opaque, thereby blocking light from propagating out of areas other than perforations 415. Various types of materials may be used for this purpose. A few non-limiting examples include various types of opaque plastics, opaque fiberglass, and composites including graphite-based composites. The criteria that may be used for selecting this material includes: a desired level of flexing capability along one or more axes, minimal weight, and high machinability (cutting, drilling, punching, polishing, finishing etc). The high machinability aspect comes into play to a large extent when fabricating the perforations 415 upon display screen component 305A.

The extent to which a light source 311 is inserted into a perforation 415 may vary from one implementation to another. For example, in one implementation, the extent of insertion may result in a light emitting surface of light source 311 being located flush with viewing plane 307 of display screen component 305A.

Figure 5:
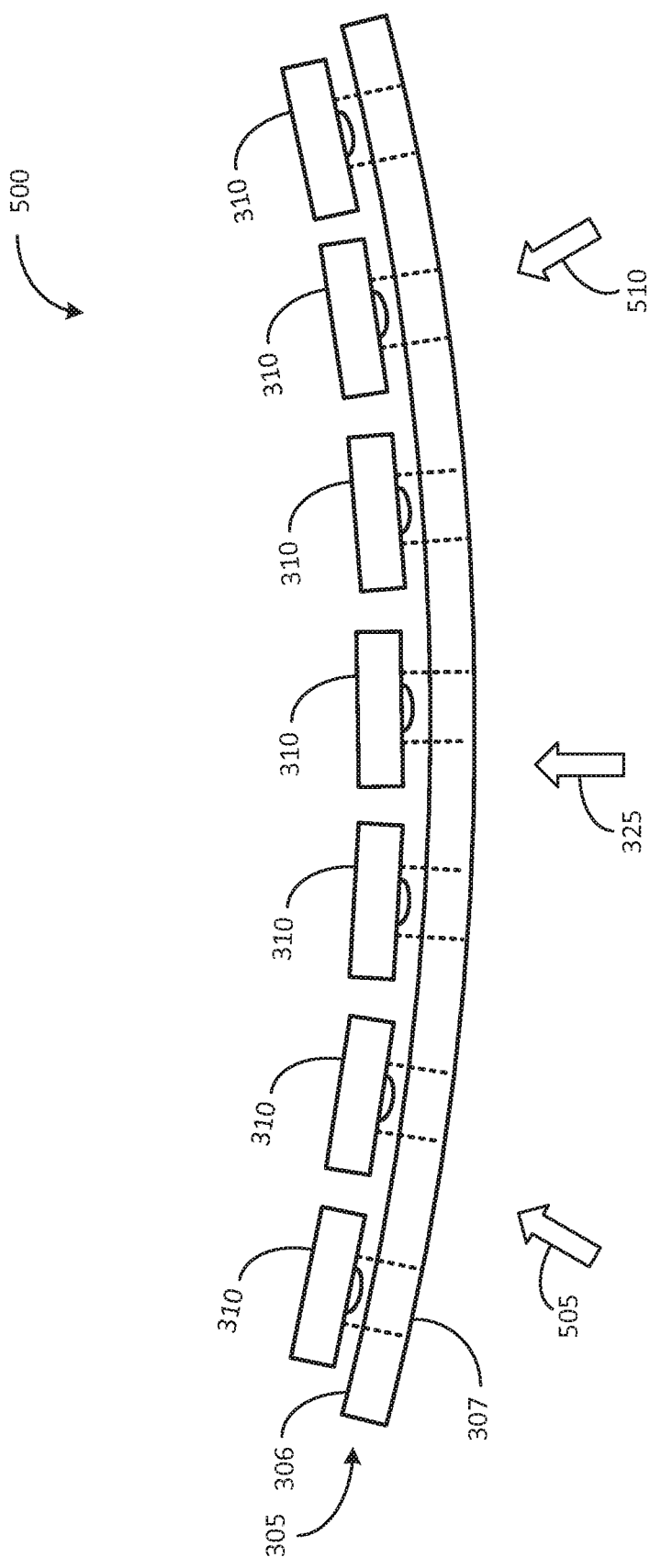
FIG. 5 shows a flexing feature of the ubiquitously mountable image display system shown in FIG. 3.

FIG. 5 shows a flexing capability of a ubiquitously mountable image display system 500. The flexing capability of display screen component 305 may be described as a post-manufacturing, multi-flexing capability that is available to an end-user of a fully manufactured ubiquitously mountable image display system 500. In other words, in a default state, display screen component 305 may take on a flat configuration with a curveless, planar viewing plane 307 (as shown in FIG. 3) that enables a viewer to view an image from a frontal location along a viewing axis designated by arrow 325 (orthogonal to planar viewing plane 307). However, an end-user may opt to reconfigure display screen component 305 so as to provide multiple viewing axes (designated by additional arrows 505 and 510), in the manner shown in FIG. 5, by suitably flexing display screen component 305.

As can be understood, the bend radius, as well as shape, of display screen component 305 may be initially selected to conform to a first mounting surface such as a curved wall, for example. Subsequently, the end-user may opt to re-use display screen component 305 upon a second mounting surface, such as a pillar for example. In order to do so, the end-user removes display screen component 305 from the curved wall, and reconfigures the shape of display screen component 305 to conform to a different curvature of the pillar so as to provide multiple viewing axes around the pillar.

One or both of the two non-planar shapes described above may be retained in their respective shapes by the use of suitable mounting fixtures as long as a particular non-planar shape is desired. In other words, a first mounting fixture, in the form of a first curved, rigid support bar may be attached to display screen component 305 when display screen component 305 is mounted on the curved wall, and the bar may be removed when display screen component 305 is mounted on the pillar using anchor bolts and hooks for example. Some additional aspects pertaining to the use of support bars will be described below using FIG. 11.

It must be recognized that this form of end-user adjustment is different in nature to a flexing operation that may be performed upon a display screen element during a manufacturing operation of a traditional display unit. The manufacture-related flexing operation provides a curvature that cannot be modified by an end-user of the traditional display unit.

Furthermore, it will be understood that the phrase "end-user" may be applied to a wide variety of people, including, for example, a buyer of the image display system, a lessee, or any other person who handles the product after the product has been shipped out of a manufacturing facility. The phrase also includes certain personnel who may be involved with the product during the manufacturing process, such as for example, a quality-control inspector or a product tester. Such personnel may test the flexibility features as well as other features of the product before shipping the product out of the manufacturing facility.

Figure 6:
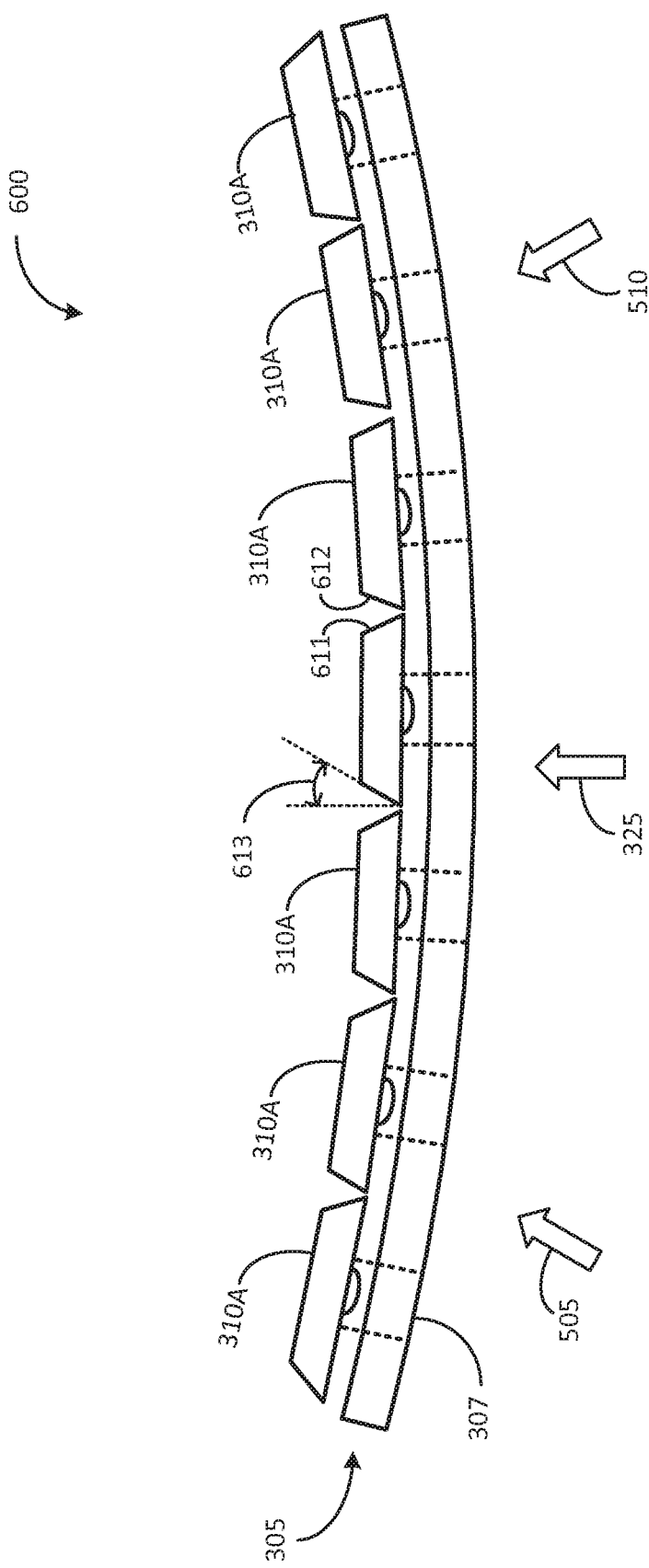
FIG. 6 shows a second alternative embodiment of the ubiquitously mountable image display system shown in FIG. 3.

FIG. 6 shows an alternative embodiment of a ubiquitously mountable image display system 600. In this embodiment, one or more of the plurality of each light source circuit module 31OA include one or more beveled edges, such as beveled edges 611 and 612 for example.

To explain the rationale behind beveled edges 611 and 612, attention is once again drawn to FIG. 5. As can be seen, each light source circuit module 310 is separated from an adjacent light source circuit module 310 by a certain separation distance. The separation distance is selected on the basis of various considerations. A first consideration is based upon obtaining a desired inter-pixel separation, which directly contributes to the overall image resolution of an image rendered on viewing plane 307. The second consideration pertains to a maximum bend radius that can be provided over a certain surface area of display screen component 305. A post-manufacturing flexing of display screen component 305 exceeding the maximum bend radius may lead to perceivable aberrations in image quality of an image rendered on viewing plane 307. Further details pertaining to perceivable aberrations will be provided below using FIG. 7.

However, the maximum separation distance that can be provided between adjacent light source circuit modules 310 of FIG. 5 is constrained by the height of each module extending above mounting surface 306. Unless separated by a minimum separation distance two adjacent light source circuit modules 310 of FIG. 5 may collide with each other when display screen component 305 is flexed to a certain extent. This extent may turn out inadequate in terms of a desired maximum bend radius.

Consequently, one solution that is directed at minimizing the negative impact, is to provide beveled edges 611 and 612 as shown in FIG. 6. Beveled edges 611 and 612 allow a greater bend radius to be provided upon display screen component 305 than that provided by straight edges, because collision of the edges of two adjacent light source circuit modules is eliminated. The slope angle 613 of one or more beveled edges can be selected on the basis of a curvature radius of the display screen component 305 when flexed to a specification limit. The specification limit may be set according to a desired image resolution as well as a maximum acceptable distortion level upon the image displayed upon viewing plane 307.

Figure 7:
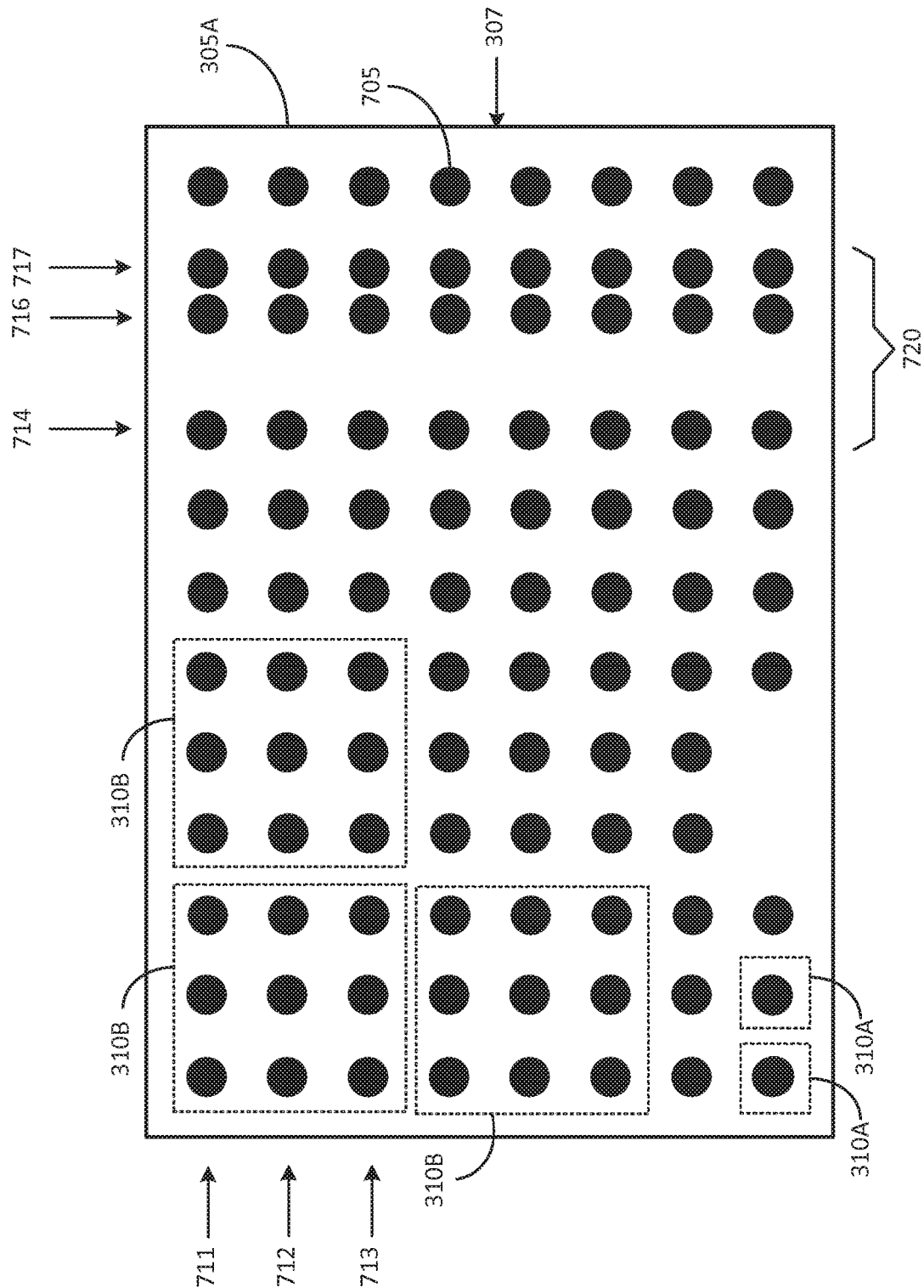
FIG. 7 shows a frontal view of a display screen component that is shown in FIG. 4.

Attention is now drawn to FIG. 7, which shows a frontal view of display screen component 305A. As shown, display screen component 305A includes a plurality of perforations 705 arranged in a matrix configuration. Each perforation 705 is shown as a circular perforation, but it will be understood that other shapes (multi-sided, oval etc) may be used instead. One among several factors that may be used in determining the shape of perforation 705 pertains to the shape of light source 311. For example, a circular shape may be used when light source 311 is a light emitting diode (LED) with a circular profile. On the other hand, when the LED has a square packaging, perforation 705 may have a corresponding square shape so as to for example, accommodate insertion of the square LED.

To elaborate upon the matrix configuration, it can be seen that rows 711, 712 and 713 are contiguous rows, while columns 714, 715 and 716 are contiguous columns. It can be further seen that the inter-row spacing between rows 711, 712 and 713 is uniformly distributed, whereas the inter-column spacing between columns 714, 715 and 716 is not uniform. The separation distance between column 714 and 715 is larger than that between columns 715 and 716. The non-uniform separation distance between columns 714 and 715 leads to a perceivable aberration 720 being created upon an image displayed on viewing surface 307.

Similarly, a non-uniform separation distance may exist between rows as well. Here again, the non-uniform separation distance between rows leads to a perceivable aberration upon an image displayed on viewing surface 307.

A viewer's attention is automatically/sub-consciously drawn to such visual incongruities, (which in this case relates to a non-uniform spacing between columns (or between rows) of a matrix of image pixels) thereby adversely affecting the viewing experience. Consequently, it is desirable to eliminate such a non-uniform distribution of separation distances between rows or columns.

In practice, the adverse effects related to such perceivable aberrations may be minimized to some extent by providing a gradual change in separation distance amongst the multiple columns located between two vertical axes located at opposing vertical edges of display screen component 305A and/or by providing a gradual change in separation distance amongst the multiple rows located between two horizontal axes located at opposing horizontal edges of display screen component 305A.

Such a gradual change in separation distance (in either the column direction or in the row direction) is automatically provided by the flexing characteristic of display screen component 305A, which eliminates abrupt angular bends upon viewing surface 307. To accomplish this feature, display screen component 305A is designed to incorporate a maximum bend radius that may be carried out at any location along a horizontal axis (and/or a vertical axis), thereby permitting display screen component 305A to be configured to one or more flexed shapes without creating any perceivable aberrations in either a horizontal or a vertical viewing direction.

It should be noted that while the description above is directed at display screen component 305A (having perforations), a person of ordinary skill in the art will recognize that there are several aspects (perceivable aberrations, separation distance between pixels etc) that are equally applicable to display screen component 305 (diffused screen, LCD screen, DLP screen etc) shown in FIG. 3.

Each light source circuit module 310 may be configured in different ways. For example, as shown, light source circuit module 310A, which includes a single light source 311 (not shown), is aligned with a corresponding single perforation 705. On the other hand, light source circuit module 310B contains multiple light sources 311 (not shown) and is attached to display screen component 305A such that each of the multiple light sources 311 is aligned to a corresponding perforation 705 in a set of perforations corresponding to the larger profile of light source circuit module 310B. While only a few of circuit modules 310A and 310B are shown, it will be understood that several more of each of these modules will be employed such that light is emitted via many more, or all, perforations 705 of display screen component 305A.

Figure 8:
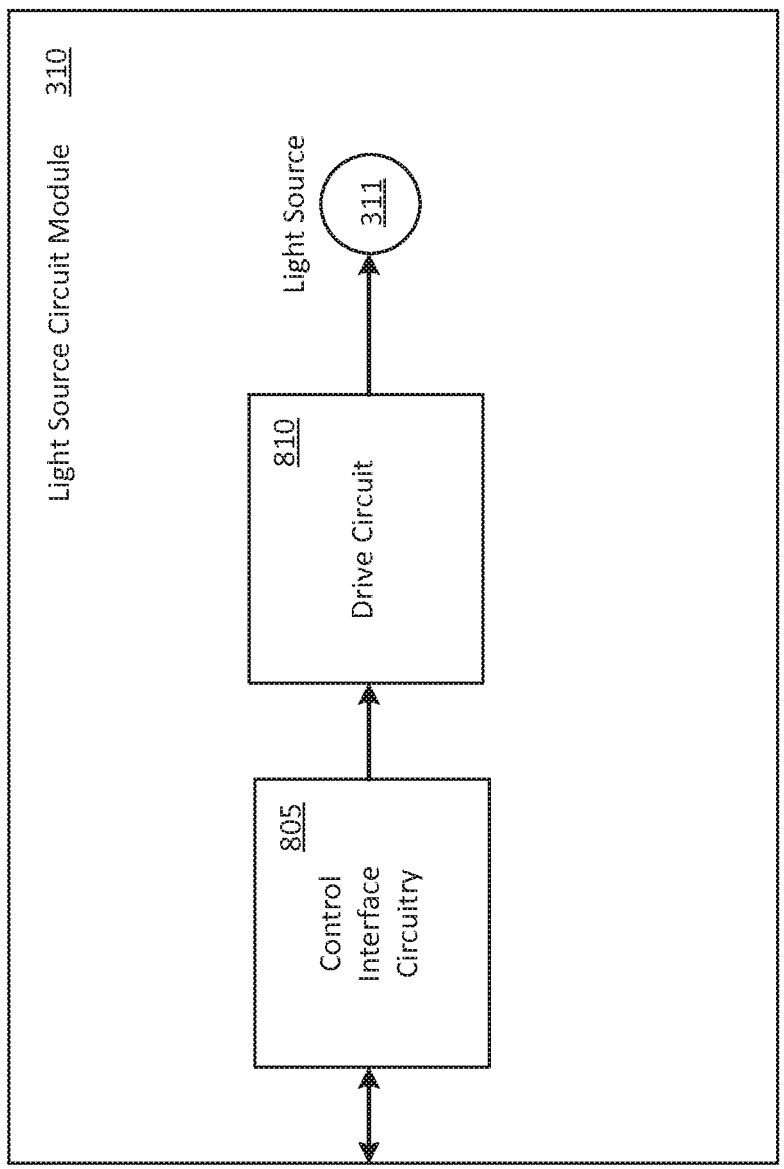
FIG. 8 shows some components of a light source circuit module that is attachable to the display screen component shown in FIG. 7.

Attention is now drawn to FIG. 8, which shows a few components of a light source circuit module 310 that can be attached to display screen component 305A as described above. Light source circuit module 310 can be fabricated in several different ways. In one embodiment, light source circuit module 310 is a printed circuit board (PCB) assembly containing a light source 311 coupled to various electronic components. A few non-limiting examples of light source 311 include a single-color LED, a bi-color LED, and a tri-color LED. When a single-color LED is used, light source 311 may be configured as a cluster of LEDs (an RGB cluster, for example). On the other hand, when ubiquitously mountable image display system 300 is a monochromatic display system, light source 311 may be formed of an incandescent bulb, or a white color LED.

Drive circuit 810 includes signal drivers that provide drive signals for driving light source 311. Control interface circuitry 805 contains circuitry that receives signals from a control unit (not shown) and suitably conditions these signals for use by drive circuit 810. The circuitry contained in control interface circuitry 805 is selected in correspondence to the type of signals transmitted from the control unit. For example, when the control unit provides wireless signals, control interface circuitry 805 includes wireless devices that receive the wireless signals and suitably demodulate these wireless signals to generate baseband signals that are then provided to drive circuit 810 for driving light source 311.

In a dynamic imaging application, where ubiquitously mountable image display system 300 is used to display moving images (movies, videos etc), control interface circuitry 805 may include signal conditioning circuitry and image processing circuitry as well.

As explained above, multiple light source circuit modules 310 are attached to display screen component 305 thus contributing to the overall weight of the integrated assembly. Consequently, as a general rule, a minimal amount of circuitry is incorporated into each light source circuit module 310 so as to minimize size, weight, and cost of each module, as well as to minimize the overall weight.

FIGS. 9A-9E show various inhospitable mounting surfaces each of which has a ubiquitously mountable image display system 300 mounted thereon. A comparison of FIGS. 9A-9E with prior art FIGS. 2A-2E would indicate the advantages provided by the inherent characteristics of ubiquitously mountable image display system 300.

Figure 9C:
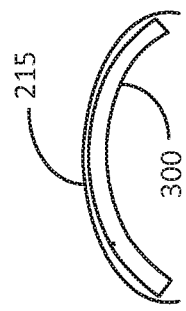
FIGS. 9A-9E show various inhospitable mounting surfaces each of which has a ubiquitously mountable image display system mounted in accordance with the invention.
Figure 9B:
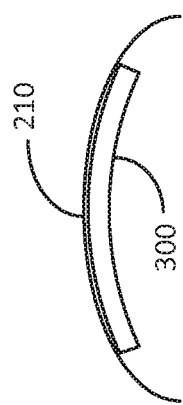
Figure 9E:
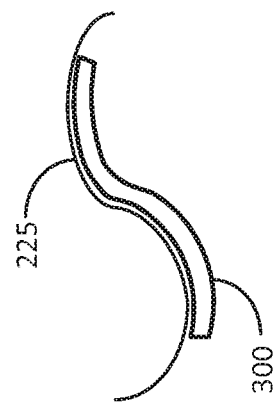
Figure 9A:
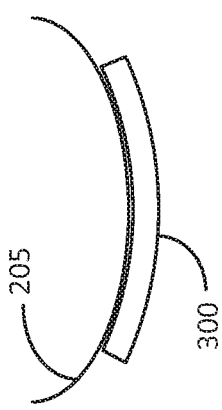
Figure 9D:
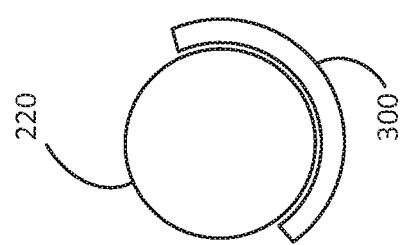
Figure 10A:
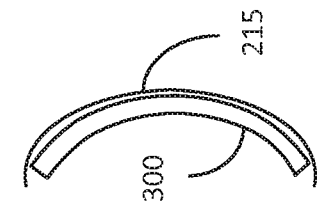
FIGS. 10A-10E show various inhospitable mounting surfaces that are oriented differently than the surfaces shown in FIGS. 9A-9E.
Figure 10B:
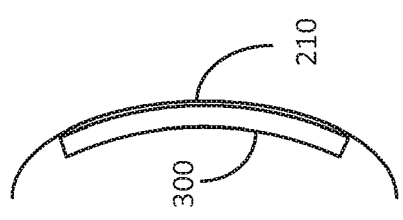
Figure 10C:
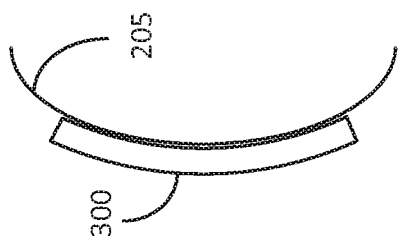
Figure 10D:
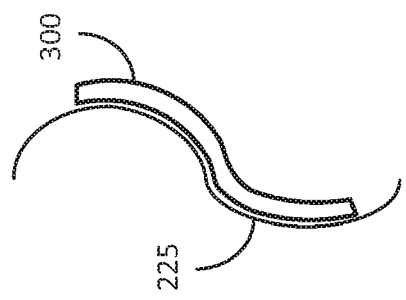
Figure 10E:
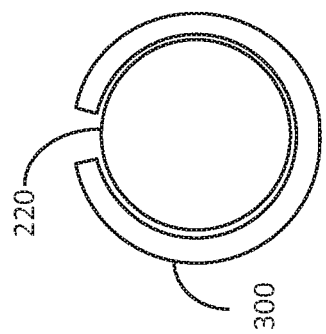

Each of surfaces 205, 210, 215 and 225 of FIGS. 9A, 9B, 9C and 9E respectively may correspond to ceiling surfaces inside a building structure—an exhibition hall, for example. FIG. 9D indicates a cylindrical structure extending in a horizontal or angular direction with respect to a floor of a building—a circular beam near the ceiling, for example.

FIGS. 10A-10E show various inhospitable mounting surfaces each of which has a ubiquitously mountable image display system 300 mounted thereon. In contrast to FIGS. 9A-9E, FIGS. 10A-10E may correspond to surfaces such as walls, niches, pillars and recesses that are oriented in a different direction. It will be understood that the reconfigurable nature of ubiquitously mountable image display system 300 permits system 300 that is mounted on a first surface (surface 220, for example) to be removed from that first surface and subsequently mounted on a second surface (surface 225, for example) with minimal effort. This minimal effort includes re-flexing ubiquitously mountable image display system 300 to correspond to the second surface 225. It may be pertinent to draw specific attention to FIG. 10d, where ubiquitously mountable image display system 300 is shown wrapped around a pillar structure. The inherent advantages provided by the flexing characteristic of display system 300 stands out in stark contrast to the prior art arrangement shown in FIG. 2D.

FIG. 11A shows ubiquitously mountable image display system 300 with a rigid, flex-retaining, attachable support bar 181 attached thereon. Support bar 181 may be formed of different types of materials. In certain applications, where permissible, support bar 181 may be formed of a metal. However, in certain other applications, where weight considerations are important, support bar 181 may be formed of a lightweight material such as a composite, for example. This lightweight material may have a pre-formed default shape, which helps ubiquitously mountable image display system 300 retain a desired shape.

In the example configuration shown in FIG. 11A, support bar 181 is a rigid bar shaped in a double-curvature configuration. When this rigid bar is attached (using mechanical fasteners, for example), ubiquitously mountable image display system 300 conforms to, and retains, the double-curvature configuration without springing back to the default flat surface condition mentioned above.

Support bar 181 is especially useful when ubiquitously mountable image display system 300 is hung in free space as shown in FIG. 11B. As can be understood, viewing surface 307 has a double-curvature characteristic that matches the double-curvature characteristic of support bar 181. The double-curvature characteristic of ubiquitously mountable image display system 300 allows multiple fields of view from different viewing angles.

When no longer needed to be hung in free space in the manner shown in FIG. 11B, ubiquitously mountable image display system 300 may be dismantled, support bar 181 detached, and ubiquitously mountable image display system 300 may be reconfigured (by using a different kind of support bar, including a flat, co-planar bar, for example) to match a different mounting location (a flat wall surface, for example). Mounting fixtures such as eyebolts 182, guy cable 183, and anchor bolt 184 may also be removed and replaced with other kinds of attachable mounting hardware that may be better suited for this different mounting location.

Figure 12:
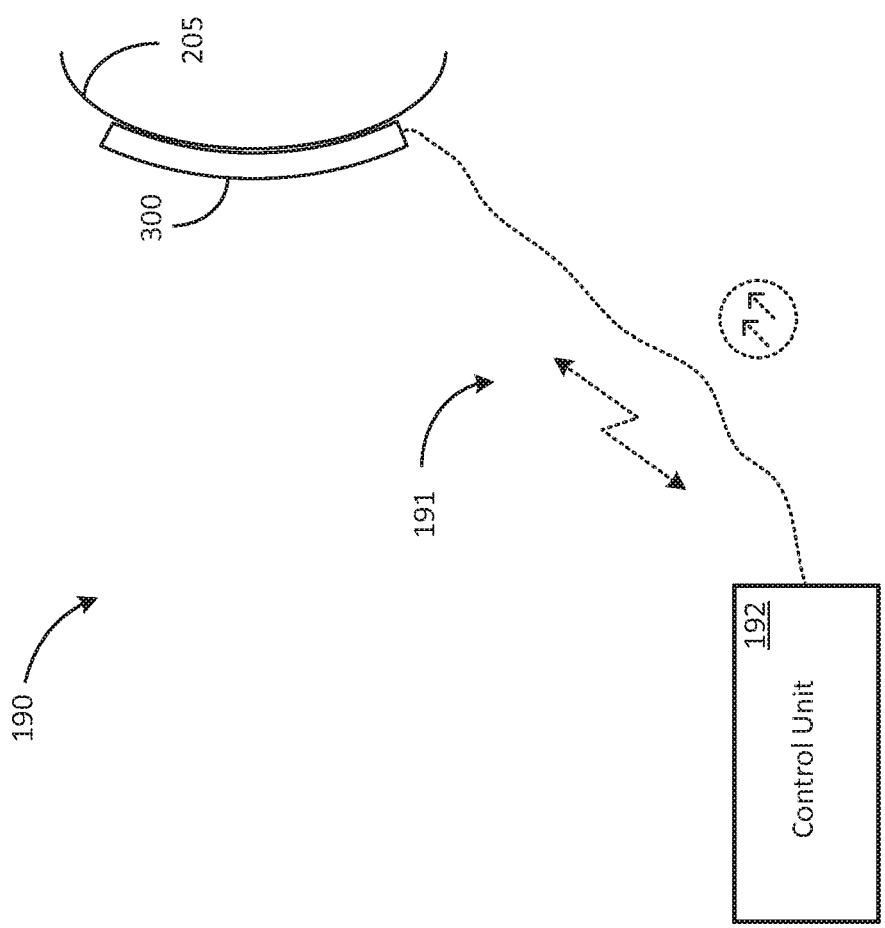
FIG. 12 shows ubiquitously mountable image display system mounted on a curved surface and communicatively coupled to a remotely located control unit.

FIG. 12 shows ubiquitously mountable image display system 300 mounted on a curved surface 205 such as an upper section of a wall for example. System 300 is communicatively coupled to a control unit 192 via a suitable communication medium 191. Some examples of communication media include wireless media (RF, infrared etc), wired media (coaxial cable, twisted pair cable etc), and fiber-optic media (optical fiber, line of sight laser etc).

Control unit 192 can be implemented in several different ways and may be considered an integral part of a display system 190 that includes ubiquitously mountable image display system 300 and any additional hardware related to communication medium 191.

In a first embodiment, control unit 192 is a dedicated unit containing hardware and software that are expressly designed for interacting with ubiquitously mountable image display system 300.

In a second embodiment, control unit 192 is implemented in a general-purpose computer such as a desktop personal computer or a laptop.

Typically, control unit 192 is located at a suitable location that is remote from surface 205. Because weight considerations and mounting considerations are comparatively less important in the case of control unit 192 than in the case of ubiquitously mountable image display system 300, control unit 192 may be placed upon various suitable surfaces, such as a tabletop, a shelf, a ledge etc. This two-piece configuration (control unit 192 and ubiquitously mountable image display system 300) of display system 190 provides various advantages for ubiquitously mounting a display system in a wide variety of locations where traditional display systems may suffer from various handicaps.

The above-described embodiments are merely set forth for a clear understanding of the principles of the disclosure. Many variations and modifications may be made without departing substantially from the disclosure. All such modifications and variations are included herein within the scope of this disclosure.

The invention claimed is:

1. An image display system comprising:
    (a) a first support structure capable of defining a first curved surface;
    (b) a control unit;
    (c) an image display screen comprising at least one light emitting display screen component;
    (d) the at least one light emitting display screen component having a plurality of light sources arranged in a matrix format, wherein each of the plurality of light sources comprises at least one light emitting circuit module and is modulated using one or more control signals provided from the control unit;
    (e) wherein the image display screen is attached to the support structure at a plurality of locations;
    (f) wherein the at least one display screen component has a default state in which the image display screen has a first curve, and a first curved state in which the first support structure causes the at least one light emitting display screen component have a second curve to conform to the first curved surface of the first support structure, the second curve having a curvature that is greater than the first curve;
    (g) wherein the image display system is operable to display an image when the image display system is conformed to the curved surface, and
    (h) wherein the plurality of light sources have a front face defining the image display screen, a rear face opposite the front face, and one or more beveled edges between the front face and the rear face.

2. The image display system according to claim 1, wherein the at least one light emitting display screen component is configured to be removed from the first support structure and attached to a second support structure capable of defining a second curved surface,
    wherein the at least one light emitting display screen component has a second curved state in which the second support structure causes the at least one light emitting display screen component to conform to the second curved surface of the second support structure, the second curved state having a different curvature from the first curved state.

3. The image display system according to claim 1, wherein the plurality of light sources arranged in the matrix format comprise a plurality of contiguous columns spaced apart by a first separation distance and a plurality of contiguous rows spaced apart by a second separation distance, the first and second separation distances being equal to one another when the one display screen component is in the default state.

4. The image display system according to claim 1, wherein the image display screen is free from perceivable aberrations when in the first curved state.

5. The image display system according to claim 1, wherein the second curve having a curvature that is greater than the first curve is defined as the second curve having a radius of curvature that is smaller than a radius of curvature of the first curve.

6. The image display system according to claim 1, wherein the one or more beveled edges each have a slope angle selected to allow the at least one light emitting display screen flex to a maximum bend radius free from perceivable aberrations in the image display screen.

7. The image display system according to claim 1, wherein the one or more beveled edges each have a slope angle selected to allow the at least one light emitting display screen flex to a maximum bend radius wherein each of the plurality of light sources is free from physical interference from an adjacent light source.

8. The image display system according to claim 7, wherein the slope angle is configured to allow each of the plurality of light sources to be free from contact with an adjacent light source.

9. The image display system according to claim 1, wherein the plurality of light sources are arranged in the matrix format comprising a plurality of contiguous columns spaced apart by a separation distance and a plurality of contiguous rows spaced apart by the separation distance, the separation distance configured to confer a maximum bend radius to the at least one light emitting display screen component,
    wherein the maximum bend radius allows the at least one light emitting display screen component to flex thereto free from perceivable aberrations in the image display screen.

10. The image display system according to claim 9, wherein the plurality of contiguous rows are disposed on the at least one light emitting display screen component in an x direction and the plurality of contiguous columns are disposed on the at least one light emitting display screen component in a y direction,
    wherein the plurality of contiguous columns has a vertical centerline at a midpoint between opposing vertical edges of the at least one light emitting display screen component and the plurality of contiguous rows has a horizontal centerline at the midpoint between opposing horizontal edges of the at least one light emitting display screen component, and
    wherein the maximum bend radius is a distance at which the separation distance gradually increases between each column in the plurality of contiguous columns from each of the opposing vertical edges to the vertical centerline.

11. The image display system according to claim 10, wherein the separation distance gradually increases between each row in the plurality of contiguous rows from each of the opposing horizontal edges to the horizontal centerline when the at least one light emitting display screen component is in the first curved state.

12. The image display system according to claim 10, wherein the perceivable aberrations in the image display screen are an aberration distance between two or more picture elements of the image caused by exceeding the maximum bend radius such that the separation distance becomes the aberration distance.

13. The image display system according to claim 10, wherein the separation distance is uniform across the plurality of contiguous columns and across the plurality of contiguous rows when the at least one light emitting display screen component is in the default state.

* * * * *